United States Patent
Sugiyama et al.

(10) Patent No.: US 9,146,014 B2
(45) Date of Patent: Sep. 29, 2015

(54) VEHICLE LIGHTING UNIT

(71) Applicant: Stanley Electric Co., Ltd., Tokyo (JP)

(72) Inventors: Takashi Sugiyama, Tokyo (JP); Shigeru Murata, Tokyo (JP); Katsunori Nakazawa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 336 days.

(21) Appl. No.: 13/651,376

(22) Filed: Oct. 12, 2012

(65) Prior Publication Data

US 2013/0094235 A1    Apr. 18, 2013

(30) Foreign Application Priority Data

Oct. 12, 2011  (JP) .................................. 2011-225366
Mar. 2, 2012  (JP) .................................. 2012-047406

(51) Int. Cl.
| | |
|---|---|
| *F21V 7/00* | (2006.01) |
| *F21S 8/10* | (2006.01) |
| *G02B 26/08* | (2006.01) |
| *G02B 26/10* | (2006.01) |

(52) U.S. Cl.
CPC ......... *F21S 48/1335* (2013.01); *F21S 48/1388* (2013.01); *F21S 48/1747* (2013.01); *F21S 48/1757* (2013.01); *G02B 26/0858* (2013.01); *G02B 26/101* (2013.01)

(58) Field of Classification Search
CPC .............. F21S 48/1388; F21S 48/1757; F21S 48/1747; F21S 48/1335; G02B 26/101; G02B 26/0858; F21V 7/00
See application file for complete search history.

(56) References Cited

U.S. PATENT DOCUMENTS

| | | |
|---|---|---|
| 2007/0177250 A1 | 8/2007 | Duncan |
| 2009/0046474 A1 | 2/2009 | Sato et al. |
| 2009/0180167 A1 | 7/2009 | Tani et al. |
| 2009/0185253 A1 | 7/2009 | Tani et al. |
| 2009/0232151 A1 | 9/2009 | Furlong et al. |
| 2011/0122101 A1* | 5/2011 | Kurozuka ..................... 345/204 |

FOREIGN PATENT DOCUMENTS

| | | |
|---|---|---|
| DE | 102009025678 A1 | 1/2010 |
| JP | 2009-3324 A | 1/2009 |

(Continued)

OTHER PUBLICATIONS

European Search Report for European Patent App. No. 12007052.9 (Feb. 19, 2013).

(Continued)

*Primary Examiner* — Thomas M Sember
(74) *Attorney, Agent, or Firm* — Kenealy Vaidya LLP

(57) ABSTRACT

A vehicle lighting unit can reduce the load applied to the actuator for driving a reflecting member as well as can improve the durability of the actuator. The vehicle lighting unit can include a light source, a reflecting member configured to reflect light from the light source toward an illumination area, an actuator including inner piezoelectric actuators and outer piezoelectric actuators configured to cause the reflecting member to swing (turn) around X and Y axes simultaneously, to thereby scan the illumination area with the reflected light from the reflecting member horizontally and vertically, and a controller configured to control the inner piezoelectric actuators and the outer piezoelectric actuators such that a scanning frequency in the vertical direction of the reflected light is larger than a scanning frequency in the horizontal direction of the reflected light.

8 Claims, 10 Drawing Sheets

(56) References Cited

FOREIGN PATENT DOCUMENTS

| | | |
|---|---|---|
| JP | 2009-48786 A | 3/2009 |
| JP | 2009-224039 A | 10/2009 |
| JP | 2010-006109 A | 1/2010 |

OTHER PUBLICATIONS

Japanese Office Action for the related Japanese Patent Application No. 2011-225366 dated Jun. 2, 2015.

* cited by examiner

VEHICLE LIGHTING UNIT

This application claims the priority benefit under 35 U.S.C. §119 of Japanese Patent Application Nos. 2011-225366 filed on Oct. 12, 2011 and 2012-047406 filed on Mar. 2, 2012, which are hereby incorporated in their entireties by reference.

TECHNICAL FIELD

The presently disclosed subject matter relates to a vehicle lighting unit, such as a vehicle headlight, for illuminating the illumination area in front of a vehicle body with light.

BACKGROUND ART

Conventionally, a certain type of vehicle headlight that can illuminate an illumination area in front of the vehicle body with light by scanning the illumination area with a light spot has been known. For example, Japanese Patent Application Laid-Open No. 2009-048786 (US2009/0046474A1 corresponding thereto) discloses such a scanning type vehicle headlight, which can include a laser light source 34, a reflecting member 33 configured to reflect light from the light source 34 to an illumination area in front of a vehicle body, and an actuator 38 configured to swing (turn) the reflecting member 33 around a first axis and a second axis so that the illumination area in front of the vehicle body can be scanned with the reflected light vertically and horizontally. Herein, the vehicle headlight is illustrated in FIGS. 1 and 2 corresponding to FIGS. 12 and 13 of Japanese Patent Application Laid-Open No. 2009-048786.

In such a scanning type vehicle headlight utilizing a light spot, light beams emitted from the laser light source 34 are reflected by the reflecting member 33 while the reflecting member 33 is turned vertically and horizontally so that the reflection direction is changed, whereby generated light spots on the illumination area can be moved vertically and horizontally. Further, in order to reduce the light intensity unevenness over the illumination area, the actuator 38 can be controlled to adjust the swing speed of the reflecting member 33 around the axes depending on the swing angle of the reflecting member 33 and/or the light intensity of the light source 34 (output of the light source) can be controlled depending on the swing angle.

Note that in the vehicle headlight, the primary scanning direction in which the scanning frequency is relatively large and the secondary scanning direction in which the scanning frequency is relatively small can be set to the horizontal direction (right-to-left direction) and the vertical direction (up-to-down direction), respectively. (See the strip lines in FIG. 2B.)

In the conventional scanning type vehicle headlight illustrated in Japanese Patent Application Laid-Open No. 2009-048786, the primary scanning direction of scanning light, or the operation direction of the actuator 38 to move the reflecting member 33 at a high speed, is set to the horizontal direction in which the swing angle range of the reflecting member 33 is large. This configuration can increase the load of the actuator 38, and as a result there is the problem in which the durability of the actuator 38 may be decreased.

Furthermore, if the reflecting member 33 is turned, the turning direction of the reflecting member 33 is reversed at both ends of the swing angle range. In this case, the moving speed (swing speed) of the reflecting member 33 may be relatively faster in the center area of the swing angle range while it may be relatively slower at both ends of the swing angle range. As a result, the illumination area with the light spot may be brighter at the farthest area (cut line at the border between the bright area and the dark area) and the nearest area in front of the vehicle body in the front-to-rear direction of the vehicle while may be darker at the center area in the front-to-rear direction. The ideal illuminance distribution at the illumination area is configured such that the illuminance at areas near the vehicle body is low (dark), the illuminance at areas away from the vehicle body is changed to be high (brighter), and the maximum illuminance is near the cut line (brightest). Therefore, there has been the problem in which the illuminance distribution over the illumination area by the conventional scanning type vehicle headlight is different from the ideal illuminance distribution.

Furthermore, in order to provide such an illuminance distribution that is close to the ideal illuminance distribution, the high swing speed of such a reflecting member and/or the light intensity of the light source should be controlled depending on the swing angle and/or turning direction, resulting in complicated control for sufficient accuracy.

SUMMARY

The presently disclosed subject matter was devised in view of these and other problems and features and in association with the conventional art. According to an aspect of the presently disclosed subject matter, a vehicle lighting unit can reduce the load applied to the actuator for driving a reflecting member as well as can improve the durability of the actuator.

According to another aspect of the presently disclosed subject matter, a vehicle lighting unit can improve the illuminance distribution over the illumination area without severe control of the swing speed of the reflecting member and the light intensity of the light source.

According to another aspect of the presently disclosed subject matter, a vehicle lighting unit can include a light source, a reflecting member configured to reflect light from the light source toward an illumination area in front of a vehicle body, an actuator configured to turn the reflecting member around a first axis and a second axis so that the illumination area in front of the vehicle body can be scanned with the reflected light vertically and horizontally, and an actuator controller configured to control the actuator such that a scanning frequency in a vertical direction of the reflected light becomes larger than a scanning frequency in a horizontal direction of the reflected light.

In the above-described vehicle lighting unit, the actuator can be controlled such that the scanning frequency in the vertical direction of the reflected light becomes larger than the scanning frequency in the horizontal direction of the reflected light, and accordingly, the primary scanning direction with the reflected light is set to the vertical direction (up-to-down direction). This means that the actuator may be operated at high speeds in the smaller swing angle range of the reflecting member which is the vertical direction. Therefore, the load to the actuator can be reduced while the durability of the actuator can be improved.

In general, the farther illumination area in the horizontal direction per unit swing angle of the reflecting member around the axis for vertical turn may be increased. In order to make the illuminance over such an illumination area uniform, the swing speed around the axis for vertical turn should be decreased when the reflected light is irradiated to the farther area in the illumination area. However, the mechanical control of the reflecting member at high swing speed with high accuracy is difficult.

If the light intensity control of a light source is performed to increase the illumination amount at the farther area, the illuminance at that area can be controlled without adjusting the swing speed mechanically, resulting in simplification of control. In this case, however, if the primary scanning direction of scanning light is the horizontal direction as in the conventional case, since the time during which the scanning light remains being located at the farther area relatively becomes longer, the time during which the light intensity of the light source also becomes longer. This may increase the generation of heat from the light source, resulting in facilitating the deterioration of light efficiency of the light source. In order to compensate for the deterioration of light efficiency, the current amount for the light source may be increased. This, however, may further enhance the generation of heat from the light source, and thus, the deterioration of light efficiency may further be decreased. This may easily become a vicious cycle.

This problem can be addressed and/or solved by providing a light intensity controller to the vehicle lighting unit. Specifically, the light intensity controller can control the light source such that when the illumination area is divided into an upper area and a lower area, the light intensity of the light source (reflected light) can be increased more during a period of scanning the upper area than during a period of scanning the lower area in a vertical scan period of the reflected light. This can eliminate the control of swing speed of the reflecting member around, for example, the first axis depending on the illumination direction of the reflected light while the illuminance over the farther area of the illumination area can be increased, thereby making the illuminance over the illumination area uniform.

Furthermore, if the primary scanning direction of the reflected light source is the vertical direction, a switching frequency between a period during which the light intensity of the light source is increased for illuminating the farther area in the illumination area with the reflected light and a period during which the light intensity of the light source is decreased for illuminating the nearer area in the illumination area with the reflected light can be increased. Thus, the respective periods during which the light source is continuously controlled to emit light with a larger intensity can be shortened. As a result, the generation of heat from the light source can be inhibited, thereby preventing the deterioration of the light emission efficiency. In other words, while the deterioration of the light emission efficiency can be prevented the illuminance at the farther areas of the illumination area can be increased.

In the above-described vehicle lighting unit, the actuator controller can control the actuator so that the upper turned edges of the scanning in the vertical direction are located above the cut line of the illumination area, and that the light intensity controller can control the light source during the vertical scan period such that the light source is turned off during a period during which a light spot formed by the scanning light is located above the cut line.

Herein, the cut line can be set not at a constant level irrespective of the widthwise positions but at varied levels corresponding to the widthwise positions. Further, the cut line of the illumination area can be defined not by the control of the swing angle of the reflecting member at the upper turned edges by the actuator, but by the switching control of the light source between ON and OFF corresponding to the swing angle around the first axis. In this manner, the swing angle range of the reflecting member around the first axis is fixed to simplify the control of the actuator while the cut line of the illumination area can be defined by the simple lighting control of the light source between ON and OFF.

In the above-mentioned vehicle lighting unit, the light intensity controller can control the light intensity of the light source on the basis of a current value variation when the light source is continuously energized or on the basis of a variation in pulse width of a pulsed current when the light source is energized in a discontinuous manner. This configuration can smoothly control the light intensity of the light source.

According to still another aspect of the presently disclosed subject matter, a vehicle lighting unit can include a light source, a first reflecting member configured to reflect light from the light source toward an illumination area in front of a vehicle body, an actuator configured to turn the first reflecting member around a first axis and a second axis orthogonal to each other simultaneously, and a second reflecting member configured to reflect part of the light reflected by the first reflecting member travelling through a predetermined lower passing range to an illumination direction of the reflected light in an upper passing range.

In the vehicle lighting unit having the above configuration, the second reflecting member can reflect part of reflected light from the first reflecting member travelling through a predetermined lower passing range out of the reflected light from the first reflecting member to a certain illumination direction of the reflected light in the upper passing range, thereby improving the illuminance distribution over the illumination area.

In the vehicle lighting unit with the above configuration, the second reflecting member can be located at a certain position and in a certain posture such that the more downward the reflected light from the first reflecting member is directed and incident on the second reflecting member, the more upward the light reflected by the second reflecting member is directed.

According to the vehicle lighting unit having the above configuration, the more downward the light reflected from the first reflecting member is directed and incident on the second reflecting surface, the more upward the second reflecting surface can reflect the light in order to illuminate the farther area with the reflected light. The moving speed (swing speed) of the first reflecting member may be relatively faster in the center area of the swing angle range in the vertical direction while it may be relatively slower at both ends of the swing angle range (turned edges). Therefore, the illuminance distribution over the illumination area can be made brighter as it is closer to the farther area near the cut line from the neighboring area in front of the vehicle body.

In the vehicle lighting unit with the above configuration, the first axis can be a swinging axis around which the first reflecting member is caused to swing horizontally so that the reflected light can scan the area horizontally, and the second axis can be a swinging axis around which the first reflecting member is caused to swing vertically so that the reflected light can scan the area vertically. Furthermore, the actuator can be controlled to cause the first reflecting member to swing around the first axis and the second axis simultaneously such that a swing frequency of the first reflecting member around the second axis becomes larger than a scanning frequency of the first reflecting member around the first axis.

In the vehicle lighting unit with the above configuration, since the swing frequency of the first reflecting member around the second axis is made larger than the swing frequency of the first reflecting member around the first axis, the number of turning over of the light spot at the cut line can be increased. The light spot at the cut line is generated when the swing speed of the first reflecting member is decreased near the turned edge irrespective of the light that is directly derived from the first reflecting member or is further reflected by the second reflecting member. With this configuration, the illuminance at the cut line can be further increased.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments. Furthermore, it should be noted that, unless otherwise specified, the up, down, right, left, front, and rear directions should be defined based on the directions in which the vehicle lighting unit is mounted in a vehicle body as a headlight.

Further, the action of the reflecting member expressed as "swing," "turn," and the like and the action of the resulting light spot (reflection light) expressed as "swing," "turn," and "scan" may be the same or similar meaning in some cases.

Figure 1:
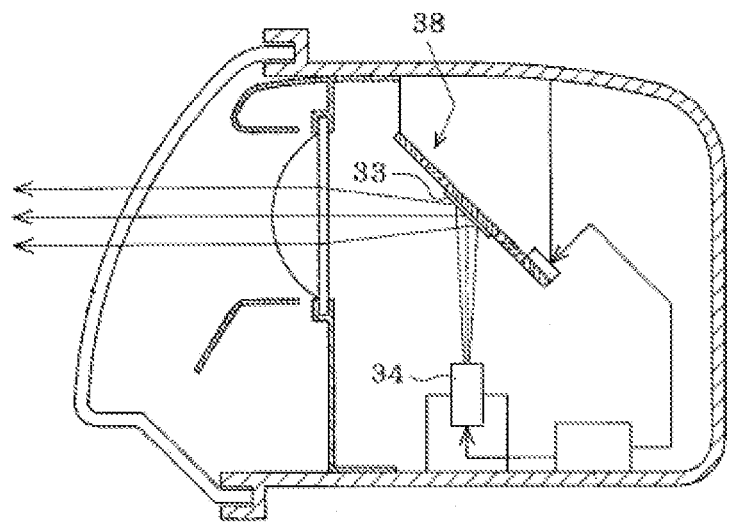
FIG. 1 is a cross-sectional view illustrating a conventional scanning type vehicle headlight (corresponding to FIG. 12 of Japanese Patent Application Laid-Open No. 2009-048786)
Figure 2A:
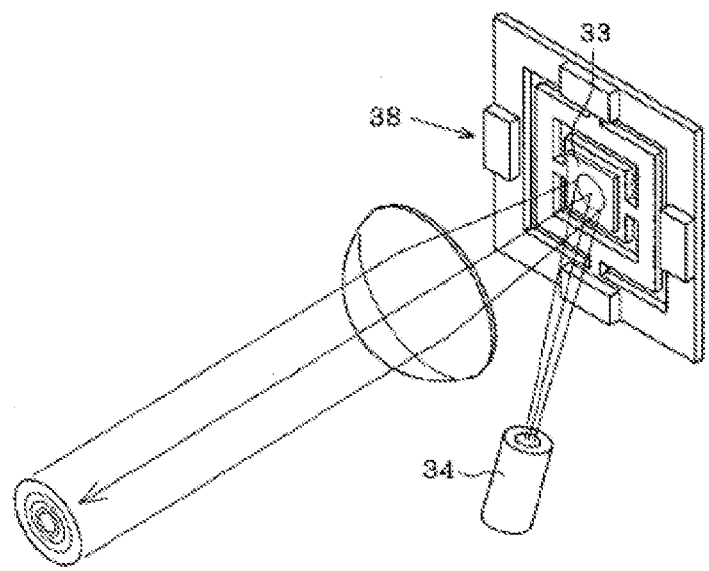
FIGS. 2A and 2B are a perspective view schematically illustrating the conventional vehicle headlight of FIG. 1 and a diagram showing a light intensity distribution formed by the headlight of FIG. 1 through a projection lens, respectively, both corresponding to FIGS. 13(a) and 13(b) of Japanese Patent Application Laid-Open No. 2009-048786.
Figure 2B:
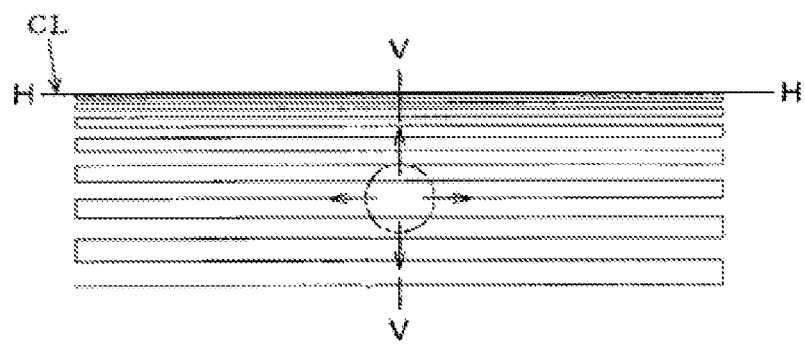
Figure 3A:
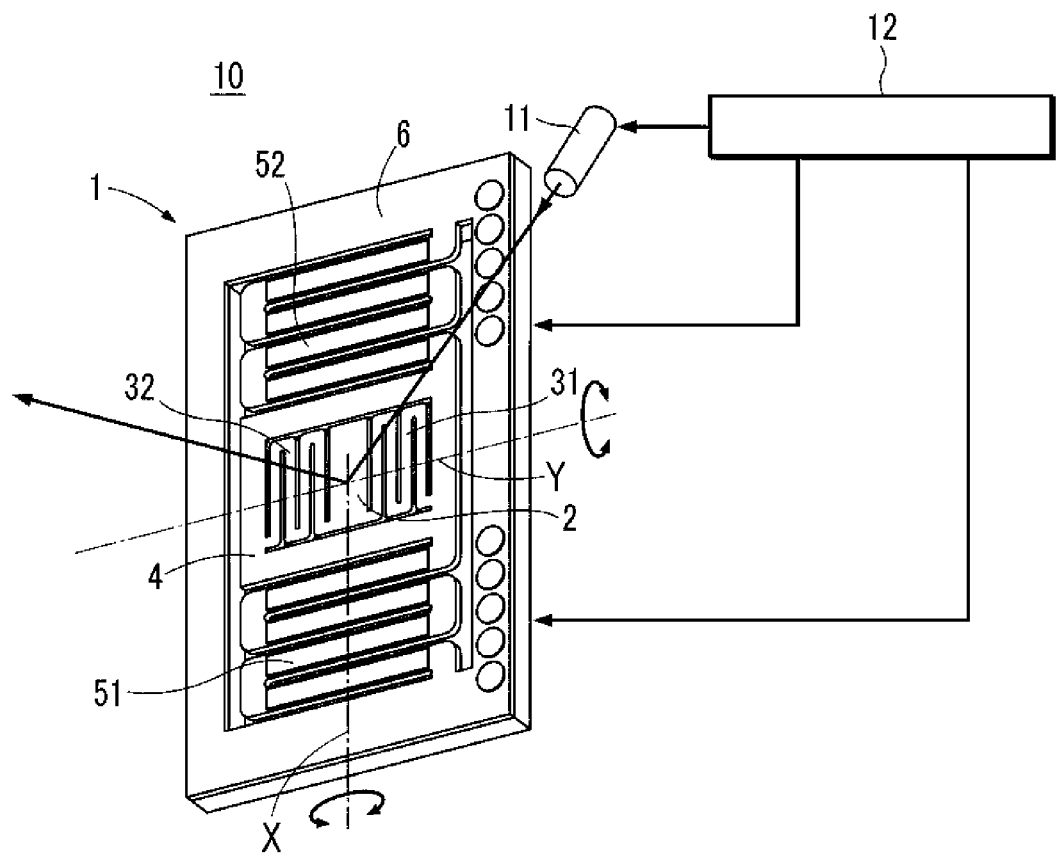
FIG. 3A is a schematic view illustrating one exemplary embodiment of a vehicle lighting unit (vehicle headlight) made in accordance with principles of the presently disclosed subject matter.
Figure 3B:
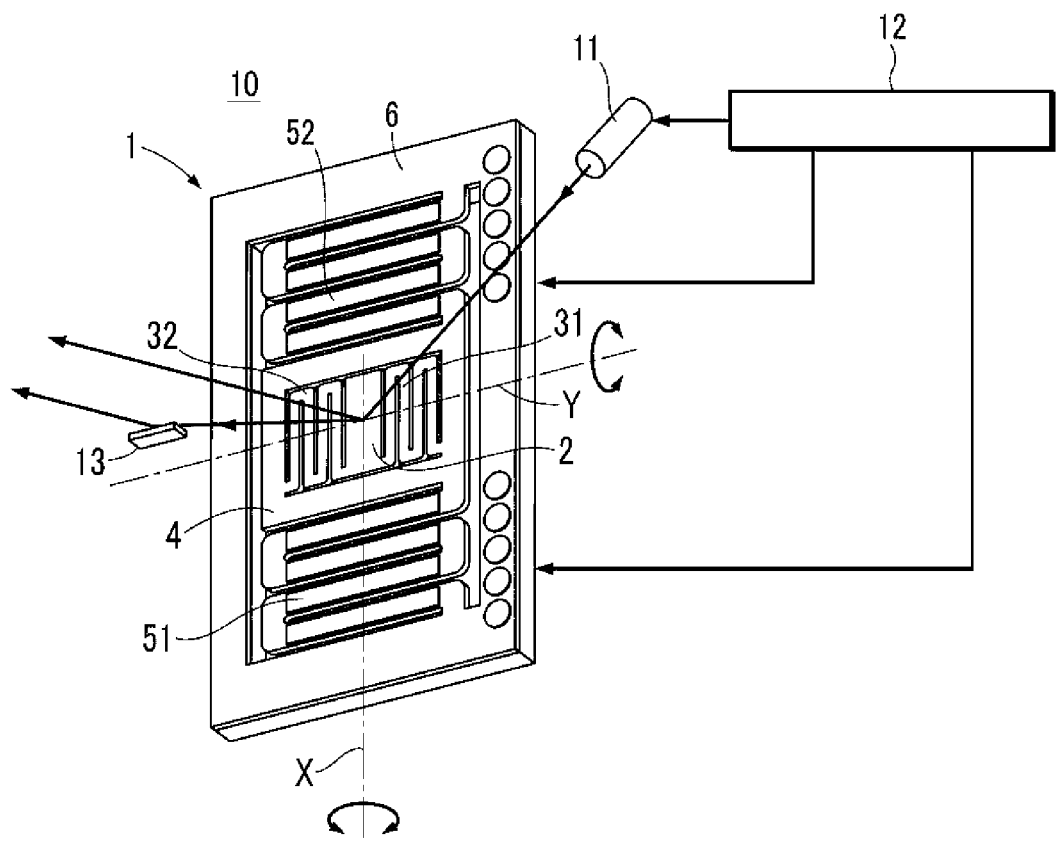
FIG. 3B is a schematic view illustrating a modification of the exemplary embodiment of the vehicle lighting unit of FIG. 3A.

With reference to FIGS. 3A and 3B, a description will be given of the main configuration of the vehicle headlight 10. The vehicle headlight 10 can be installed to a vehicle body (not shown) at either front side so that the headlight 10 can project light forward. The vehicle headlight 10 can include an optical deflector 1 having a reflecting member 2, a laser light source 11 configured to emit laser light to the reflecting member 2 of the optical deflector 1, and a controller 12 serving as a light intensity controller for controlling the light intensity of the laser light source 11 and an actuator controller for controlling the swing angle of the reflecting member 2. As shown in FIG. 3B, the vehicle headlight 10 may further include, in addition to the above components, an auxiliary reflecting member or second reflecting member 13. A description will be given of the vehicle headlight 10 including the auxiliary reflecting member 13 later as a second exemplary headlight.

The laser light source 11 can emit laser light toward the reflecting member 2 of the optical deflector 1. Laser light is one example of luminous fluxes having a high directivity.

The reflecting member 2 and the auxiliary reflecting member 13 can be formed from a mirror which can be a general mirror, a mirror-finished resin member, or the like member. The reflecting member 2 can be turned around an X axis and a Y axis, which are orthogonal to each other, to be described later with reference to FIG. 5. The direction of reflection of laser light emitted from the laser light source 11 by the reflecting member 2 can be varied vertically and horizontally at a predetermined cycle, so that the reflected luminous fluxes can be projected toward the front illumination area in front of a vehicle body. The auxiliary reflecting member 13 can be fixed to a not-shown casing of the vehicle headlight 10, and can have a surface area where laser light derived from the reflecting member 2 and passing through a certain vertical range and a certain horizontal range can be impinge on.

The controller 12 can deliver control signals to the optical deflector 1 and the laser light source 11, thereby controlling the swing angle of the reflecting member 2 in the optical deflector 1 and the light intensity of the laser light source 11. Note that in the vehicle headlight 10 of the following exemplary embodiments, the light intensity is constant and the turning-ON state is maintained during its operation, unless otherwise specified. In order to provide a desired illuminance distribution in the illumination area, the vehicle headlight 10 can be controlled such that the light intensity of the light source can be controlled in accordance with the swing angles of the reflecting member 2 around the X axis and the Y axis, such that the headlight 10 is turned on during the forward path of each scanning cycle and turned off during the return path of each scanning cycle, and such that the headlight 10 is turned on up to the cut line and turned off above the cut line corresponding to the horizontal position in order to set the cut line as the boundary extending horizontally.

Figure 4A:
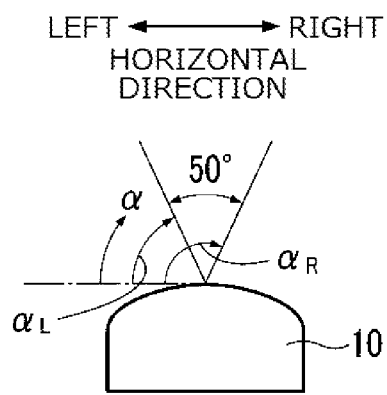
FIG. 4A is a diagram illustrating the scanning angle (swing angle) of scanning light projected from the vehicle headlight of FIG. 3A in the horizontal direction (swing angle α in the right-to-left direction) and FIG. 4B is a diagram illustrating the scanning angle (swing angle) of the scanning light in the vertical direction (swing angle β in the up-to-down direction)
Figure 4B:
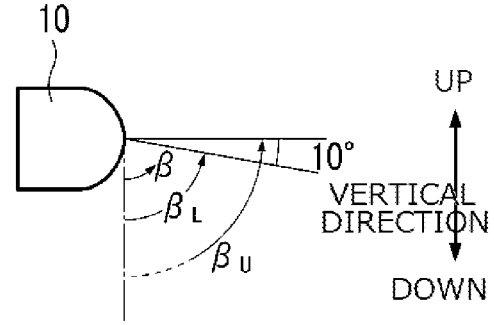

With reference to FIGS. 4A and 4B, a description will be given of the scanning angle of the laser light projected from the vehicle headlight 10. The laser light from the vehicle headlight 10 is light emitted from the laser light source 11 and having a high directivity. Since the laser light is projected by being reflected by the reflecting member 2 of the optical deflector 1, it will be referred to as "reflected light." It should be noted that as shown in FIGS. 3A and 3B, the laser light projected from the vehicle headlight 10 can include the laser light reflected only by the reflecting portion 2 and the laser light reflected by the reflecting portion 2 and then by the auxiliary reflecting portion 13.

Assume that the laser light is projected from the vehicle headlight 10 by a horizontal angle α and a vertical angle β, as shown in FIGS. 4A and 4B. The horizontal angle α and the vertical angle β can be defined by angles around the X axis and the Y axis, respectively. During the operation of the vehicle headlight 10, the reflecting member 2 can turn (swing) around the X and Y axes by a predetermined frequency, and thus, the direction or posture of the reflecting member 2 around the respective X and Y axes is always changed.

FIG. 4A is a diagram illustrating the horizontal scanning angle (swing angle) range of projected light (reflected light) projected from the vehicle headlight 10 when the headlight 10 is viewed from above and the X axis is vertical. The horizontal angle α in the right-to-left direction can be defined by an angle around the vertical line (X axis) passing through the reflection point of incident light within the vehicle headlight 10. The leftmost position in the front area is assumed to α=0°, and the positive direction of α is the clockwise direction around the vertical line. Accordingly, the position straight ahead of the vehicle headlight 10 is α=90°, and the rightmost position is α=180°. Furthermore, $\alpha_L$ and $\alpha_R$ correspond to the leftmost and rightmost positions in the illumination range by the laser light projected form the vehicle headlight 10. For example, in the present exemplary embodiment, the scanning angle range is set such that $\alpha_L$=65° and $\alpha_R$=115°, meaning that the range is ±25° around α=90° or is 50°.

FIG. 4B is a diagram illustrating the vertical scanning angle (swing angle) range of projected light (reflected light) projected from the vehicle headlight 10 when the headlight 10 is viewed from its side and the Y axis is horizontal. In FIG. 4B, the right side of the drawing is the front of the vehicle body. The vertical angle β in the up-to-low direction can be defined by an angle around the horizontal line (Y axis) passing through the reflection point of incident light within the vehicle headlight 10. The position immediately below and in the vertical direction is assumed to β=0°, and the positive direction of β is the anti-clockwise direction around the horizontal line. Accordingly, the position straight ahead of the vehicle headlight 10 is β=90°. Furthermore, $\beta_L$ and $\beta_U$ correspond to the lowermost and uppermost positions in the illumination range by the laser light projected form the vehicle headlight 10. For example, in the present exemplary embodiment, the scanning angle range is set such that $\beta_L$=80° and $\beta_U$=90°, meaning that the range is ±5° around β=85° or is 10°.

As shown, the scanning angle of the laser light (reflected light) projected from the vehicle headlight 10 toward the front illumination area includes the horizontal angle range of 50° and the vertical angle range of 10°, so that the vertical size is significantly smaller than the horizontal size. The relationship between this point and the advantageous effects of the vehicle headlight 10 will be described later.

Furthermore, it should be noted that the angles of $\alpha_L$, $\alpha_R$, $\beta_L$, and $\beta_U$ are the defining angles for the horizontal and vertical border lines of the illumination area by the laser light during the energization of the laser light source 11. Note that the ranges between $\alpha_L$ and $\alpha_R$, and between $\beta_L$ and $\beta_U$ are the angle ranges corresponding to the horizontal and vertical swing angle ranges of the reflecting member 2 during the normal swing control of the reflecting member 2 (for example, the swing control performed on the scan illustrated in FIGS. 6A and 6B to be described later). On the other hand, note that if the swing control of the reflecting member 2 accompanies the ON-OFF control of the laser light source 11 (for example, the swing control performed on the scan illustrated in FIG. 8 to be described later), the ranges between $\alpha_L$ and $\alpha_R$, and between $\beta_L$ and $\beta_U$ are the angle ranges narrower than the horizontal and vertical swing angle ranges of the reflecting member 2.

A description will now be given of the concrete configuration of the optical deflector 1 with reference to FIG. 5. The optical deflector 1 such as those shown in FIG. 5 can be the same or similar as the optical deflector, in terms of the configuration, as those described in Japanese Patent Application Laid-Open Nos. 2009-169326 and 2009-223165 which are related to U.S. Patent Publication Nos. 2009/180167, 2009/185253, and 2009/323151 which have been filed by the same applicant as that of the subject application. Note that the primary scanning direction and secondary scanning direction, and the set values for the primary scanning frequency and secondary scanning frequency can be appropriately set according to the intended control contents. Further, note that the detailed configuration and action of the optical deflector can be referred to as those described in the above-referenced publications, which are hereby incorporated in their entirety by reference. Accordingly, the brief description of the optical deflector 1 will be given. It should be understood that the optical deflector 1 can be any optical deflector other than those described in the publications as long as the reflecting member 2 can be caused to simultaneously swing around respective two axes substantially perpendicular (i.e. perpendicular or almost perpendicular) to each other. Furthermore, the optical deflector 1 may be produced by integrating mirrors, piezoelectric actuators, and other mechanical parts on a single semiconductor substrate using a semiconductor production process or micro-machining technology, as a micro electro mechanical systems device (MEMS device) as described in these publications.

Figure 5:
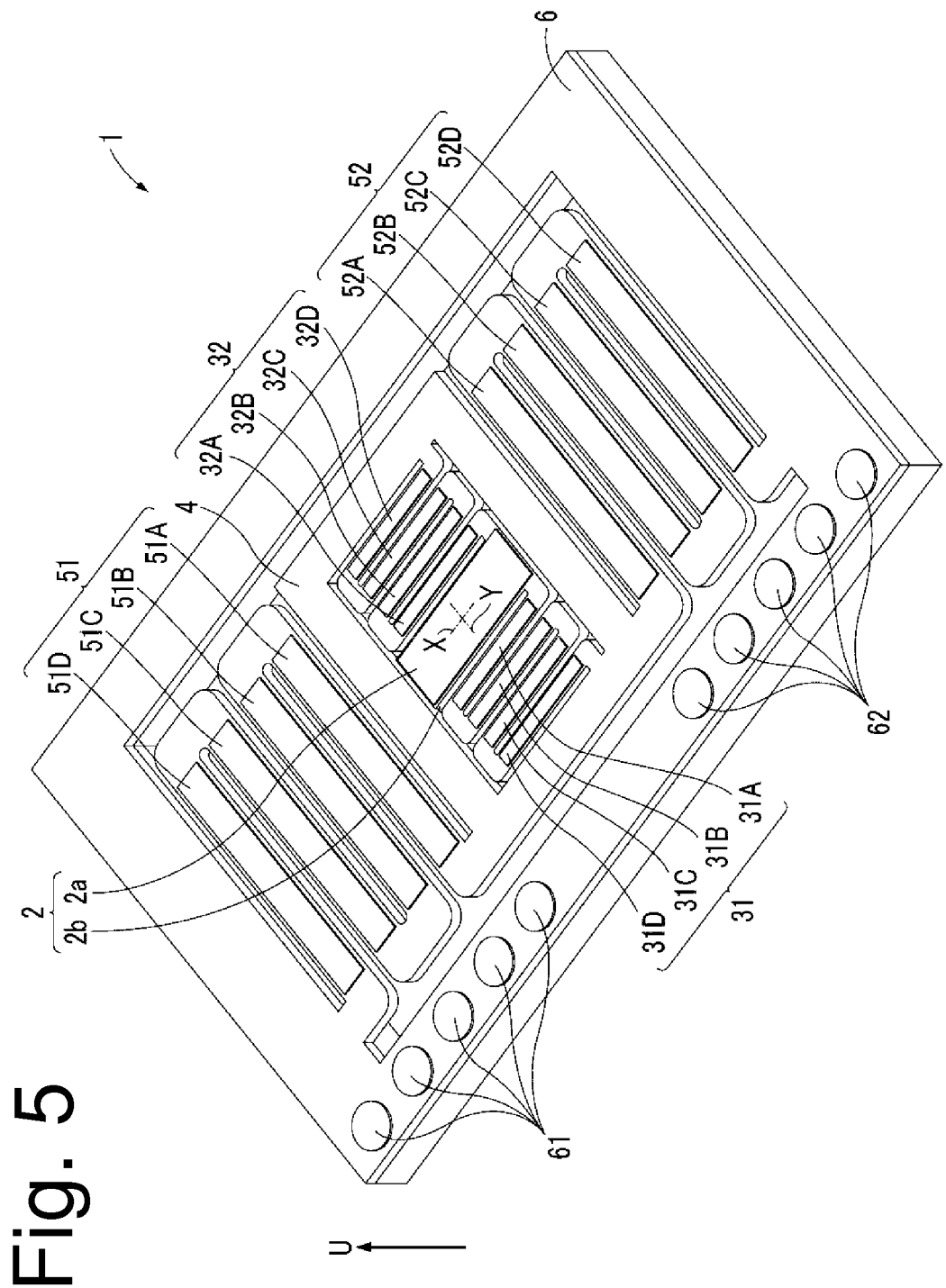
FIG. 5 is a perspective view illustrating the configuration of an optical deflector provided with the vehicle headlight of FIG. 3A (3B)

Note that FIG. 5 shows the optical deflector 1 being horizontally long, or the X axis is aligned in the left-to-right direction and the Y axis is aligned in the up-to-down direction. However, as shown in FIG. 3, the optical deflector 1 can be installed within the vehicle headlight 10 such that the optical deflector is vertically long. Namely, the actual arrangement of the optical deflector 1 can be such that the Y axis almost corresponds to the horizontal direction and the X axis almost corresponds to the vertical direction.

The optical deflector 1 can include a reflecting member 2 functioning as a mirror, a pair of inner piezoelectric actuators 31 and 32, an inner support 4, a pair of outer piezoelectric actuators 51 and 52, and an outer support 6.

The reflecting member 2 can include a rectangular reflecting surface 2a configured to reflect light incident thereon, and a rectangular reflecting-surface support 2b configured to support the reflecting surface 2a. The reflecting surface 2a can be formed by processing a metal thin film formed on the reflecting-surface support 2b by utilizing a semiconductor planar process. The thickness of the metal thin film can be 100 nm to 500 nm. The metal thin film can be produced by a sputtering method, an electron beam evaporation method, or the like. Further, the reflecting-surface support 2b can be formed of a silicon substrate.

The reflecting member 2 can be caused to swing (turn) around the respective X and Y axes by a support structure to be described in detail later. Here, the X and Y axes extend in the plane directions of the reflecting member 2 and perpendicular to each other to cross at the center of the reflecting member 2. With this configuration, the optical deflector 1 arranged while being vertically long can be operated such that the reciprocating swing of the reflecting member 2 around the X axis can vary the horizontal axis α of the reflected light while the reciprocating swing of the reflecting member 2 around the Y axis can vary the vertical axis angle β of the reflected light.

The inner piezoelectric actuators 31 and 32 can be disposed to face to each other with the reflecting member 2 interposed therebetween. Then the inner piezoelectric actuators 31 and 32 can be connected to the corresponding sides of the reflecting member 2 at the respective tip ends thereof, respectively. Note that the connected sides of the reflecting member 2 are perpendicular to the Y axis.

The inner support 4 can be formed to have a rectangular frame shape so as to surround the reflecting member 2 and the inner piezoelectric actuators 31 and 32. The inner support 4 can be connected to the other tip ends of the inner piezoelectric actuators 31 and 32 where the reflecting member 2 is not connected, thereby supporting the reflecting member 2 through the inner piezoelectric actuators 31 and 32.

The outer piezoelectric actuators 51 and 52 can be disposed to face to each other with the inner support 4 interposed therebetween. Then the outer piezoelectric actuators 51 and 52 can be connected to the corresponding sides of the inner support 4 at the respective tip ends thereof, respectively. Note that the connected sides of the inner support 4 are parallel to the Y axis.

The outer support 6 can be formed to have a rectangular frame shape so as to surround the inner support 4 and the outer piezoelectric actuators 51 and 52. The outer support 6 can be connected to the other tip ends of the outer piezoelectric actuators 51 and 52 where the inner support 4 is not connected, thereby supporting the inner support 4 through the outer piezoelectric actuators 51 and 52.

A description will be given of the inner piezoelectric actuators 31 and 32. The inner piezoelectric actuators 31 and 32 can each have the same structure and be arranged symmetrically with respect to the reflecting member 2 in the direction of the narrow width of the optical deflector 1 (see FIG. 5). Hereinafter, only one of the inner piezoelectric actuators, 31 will be described as a representative example. Note that the inner piezoelectric actuator 31 can include inner piezoelectric cantilevers 31A to 31D which correspond to respective inner piezoelectric cantilevers 32A to 32D of the inner piezoelectric actuator 32.

The inner piezoelectric cantilevers 31A to 31D can be arranged such that their longer sides are adjacent to each other and side by side at regular intervals therebetween so that the reflecting member 2 can swing (turn) around the Y axis. Further, the inner piezoelectric cantilevers 31A to 31D can be connected to the adjacent one of them such that the connected cantilever is turned back with respect to the adjacent cantilever.

In this manner, the inner piezoelectric actuator 31 can be configured such that the inner piezoelectric cantilevers 31A to 31D can take a so-called meander shape.

Specifically, the inner piezoelectric cantilever 31A closest to the reflecting member 2 is referred to as a first inner piezoelectric cantilever, and can be connected to the inner piezoelectric cantilever 31B, which is a second inner piezoelectric cantilever, at one end and connected to the outer periphery (part of one side) of the reflecting member 2 at the other end.

Similarly, the inner piezoelectric cantilever 31D closest to the inner support 4 is referred to as a fourth inner piezoelectric cantilever, and can be connected to the inner piezoelectric cantilever 31C, which is a third inner piezoelectric cantilever, at one end and connected to the inner periphery (part of one side) of the inner support 4 at the other end.

In the same manner the middle inner piezoelectric cantilevers 31B and 31C can be connected to each other.

Further, as described above, the other inner piezoelectric actuator 32 which includes the inner piezoelectric cantilever 32A to 32D can have the same structure as that of the inner piezoelectric actuator 31.

With this configuration, the reflecting member 2 can be caused to swing (turn) around the Y axis with respect to the inner support 4 due to the flexion deformation of the inner piezoelectric cantilevers 31A to 31D and 32A to 32D which constitute the inner piezoelectric actuators 31 and 32, respectively.

A description will be given of the outer piezoelectric actuators 51 and 52. The outer piezoelectric actuators 51 and 52 can have the same structure and be arranged symmetrically with respect to the reflecting member 2 in the direction of the wide width of the optical deflector 1 (see FIG. 5). Hereinafter, only one of the outer piezoelectric actuators, 51 will be described as a representative example. Note that the outer piezoelectric actuator 51 can include outer piezoelectric cantilevers 51A to 51D which correspond to respective outer piezoelectric cantilevers 52A to 52D of the outer piezoelectric actuator 52.

The outer piezoelectric cantilevers 51A to 51D can be arranged such that their longer sides are adjacent to each other side by side at regular intervals therebetween so that the reflecting member 2 can swing (turn) around the X axis. Further, the outer piezoelectric cantilevers 51A to 51D can be connected to adjacent ones of them such that the connected cantilever is turned back with respect to the adjacent cantilever.

In this manner, the outer piezoelectric actuator 51 can also be configured such that the outer piezoelectric cantilevers 51A to 51D can take a so-called meander shape.

Specifically, the outer piezoelectric cantilever 51A closest to the reflecting member 2 (to the inner support 4) is referred to as a first outer piezoelectric cantilever, and can be connected to the outer piezoelectric cantilever 51B, which is a second outer piezoelectric cantilever, at one end and connected to the outer periphery (part of one side) of the inner support 4 at the other end.

Similarly, the outer piezoelectric cantilever 51D closest to the outer support 6 is referred to as a fourth outer piezoelectric cantilever, and can be connected to the outer piezoelectric cantilever 51C, which is a third outer piezoelectric cantilever, at one end and connected to the inner periphery (part of one side) of the outer support 6 at the other end.

In the same manner the middle outer piezoelectric cantilevers 51B and 51C can be connected to each other.

Further, as described above, the other outer piezoelectric actuator 52 which includes the outer piezoelectric cantilever 52A to 52D can have the same structure as that of the outer piezoelectric actuator 51.

With this configuration, the inner support 4 (in turn, the reflecting member 2) can be caused to swing (turn) around the X axis with respect to the outer support 6 due to the flexion deformation of the outer piezoelectric cantilevers 51A to 51D and 52A to 52D which constitute the outer piezoelectric actuators 51 and 52, respectively.

Note that the optical deflector 1 of the present exemplary embodiment includes four piezoelectric cantilevers for each piezoelectric actuator 31, 32, 51, or 52, but the number thereof is not limited to four.

The optical deflector 1 can include a plurality of electrode pads 61 and 62, for example, on one side of the outer support 6. In FIG. 5, they are arranged on the right and the left of the lower side. The electrode pads 61 can be configured to energize respective electrode portions of the inner piezoelectric cantilevers 31A to 31D and the outer piezoelectric cantilevers 51A to 51D while the electrode pads 62 can be configured to energize respective electrode portions of the inner piezoelectric cantilevers 32A to 32D and the outer piezoelectric cantilevers 52A to 52D.

Each piezoelectric cantilever can include a laminated structure having a support serving as an elastic body, and a lower electrode, a piezoelectric body, and an upper electrode formed on the support. When a drive voltage corresponding to each piezoelectric cantilever is applied to the upper electrode and the lower electrode of the certain piezoelectric cantilever through the electrode pads 61, 62, the piezoelectric body between the upper and lower electrodes can be deflected and deformed by the piezoelectric drive. Thereby, the support or the elastic body of the piezoelectric cantilever in response to the deflected and deformed piezoelectric body can be deflected and deformed. In this manner, the entire actuators 31 and 32, and 51 and 52 can drive the reflecting member 2 around the X and Y axes simultaneously. The details of the drive will be described below.

A description will be given of the operation of the optical deflector 1. First, a description will be given of the swinging (turning) around the Y axis of the reflecting member 2 with respect to the inner support 4 by the inner piezoelectric actuators 31 and 32.

In this case, the controller 12 can apply drive voltages to the inner piezoelectric actuators 31 and 32 via the electrode pads 61 and 62. Specifically, the controller 12 can apply a first voltage Vy1 to the corresponding electrodes of the odd-numbered inner piezoelectric cantilevers 31A and 31C of the inner piezoelectric actuator 31 for driving. At the same time, the controller 12 can apply a second voltage Vy2 to the corresponding electrodes of the even-numbered inner piezoelectric cantilevers 31B and 31D of the inner piezoelectric actuator 31 for driving.

Furthermore, the controller 12 can apply the first voltage Vy1 to the corresponding electrodes of the odd-numbered inner piezoelectric cantilevers 32A and 32C of the inner piezoelectric actuator 32 for driving. At the same time, the controller 12 can apply the second voltage Vy2 to the corresponding electrodes of the even-numbered inner piezoelectric cantilevers 32B and 32D of the inner piezoelectric actuator 32 for driving.

Herein, the first voltage Vy1 and the second voltage Vy2 can be an alternating voltage (for example, a sinusoidal wave or saw-tooth wave) having an opposite phase to each other or shifted phase. Specifically, the voltage component for the swinging of the first voltage Vy1 and the second voltage Vy2 can be set such that the angle variation of the odd-numbered inner piezoelectric cantilevers 31A, 31C and 32A, 32C and the angle variation of the even-numbered inner piezoelectric cantilevers 31B, 31D, and 32B, 32D occur in opposite direction with respect to the vertical direction of the inner piezoelectric actuators 31 and 32 (along the direction indicated "U" in FIG. 5).

For example, if the tip ends of the inner piezoelectric actuators 31 and 32 are shifted in the upper direction (in the direction "U" in FIG. 5) in order to cause the reflecting member 2 to swing (turn) around the Y axis, the odd-numbered inner piezoelectric cantilevers 31A, 31C, 32A, and 32C are shifted upward while the even-numbered inner piezoelectric cantilevers 31B, 31D, 32B, and 32D are shifted downward. On the other hand, if the tip ends of the inner piezoelectric actuators 31 and 32 are shifted in the lower direction (in the direction opposite to "U" in FIG. 5), the odd-numbered inner piezoelectric cantilevers 31A, 31C, 32A, and 32C are shifted downward while the even-numbered inner piezoelectric cantilevers 31B, 31D, 32B, and 32D are shifted upward. By controlling the applied voltages, the odd-numbered inner piezoelectric cantilevers 31A, 31C, 32A, and 32C and the even-numbered inner piezoelectric cantilevers 31B, 31D, 32B, and 32D are deflected and deformed in respective opposite directions.

Next, a description will be given of the swinging (turning) around the X axis of the reflecting member 2 with respect to the outer support 6 by the outer piezoelectric actuators 51 and 52. In this case, the controller 12 can apply drive voltages to the outer piezoelectric actuators 51 and 52 via the electrode pads 61 and 62. Specifically, the controller 12 can apply a third voltage Vx1 to the corresponding electrodes of the odd-numbered outer piezoelectric cantilevers 51A and 51C of the outer piezoelectric actuator 51 for driving. At the same time, the controller 12 can apply a fourth voltage Vx2 to the corresponding electrodes of the even-numbered outer piezoelectric cantilevers 51B and 51D of the outer piezoelectric actuator 51 for driving. The respective concrete driving of the outer piezoelectric actuators 51 and 52 can be the same as those of the inner piezoelectric actuators 31 and 32, and accordingly, repeated descriptions will be omitted here.

With this configuration, the optical deflector 1 can simultaneously cause the reflecting member 2 to swing (turn) around the Y axis and the inner support 4 to swing (turn) around the X axis, thereby causing the reflecting member 2 to drive at various angles to reflect incident light to various angled directions.

The inner piezoelectric actuators 31 and 32 and the outer piezoelectric actuators 51 and 52 can include components of the piezoelectric cantilevers 31A to 31D, 32A to 32D, 51A to 51D, and 52A to 52D each having a piezoelectric body. Accordingly, it should be noted that the inner piezoelectric actuators 31 and 32 and the outer piezoelectric actuators 51 and 52 can serve as movable linking members for linking the inner support 4 and the outer support 6 so as to allow the reflecting member 2 to swing (turn) around the X and Y axes, in addition to the function of actuators for driving the reflecting member 2 around the X and Y axes. Therefore, one aspect of the disclosed subject matter is to provide a device and structures that reduce the burdens of the inner piezoelectric actuators 31 and 32 and the outer piezoelectric actuators 51 and 52 and to improve the durability thereof.

Figure 6A:
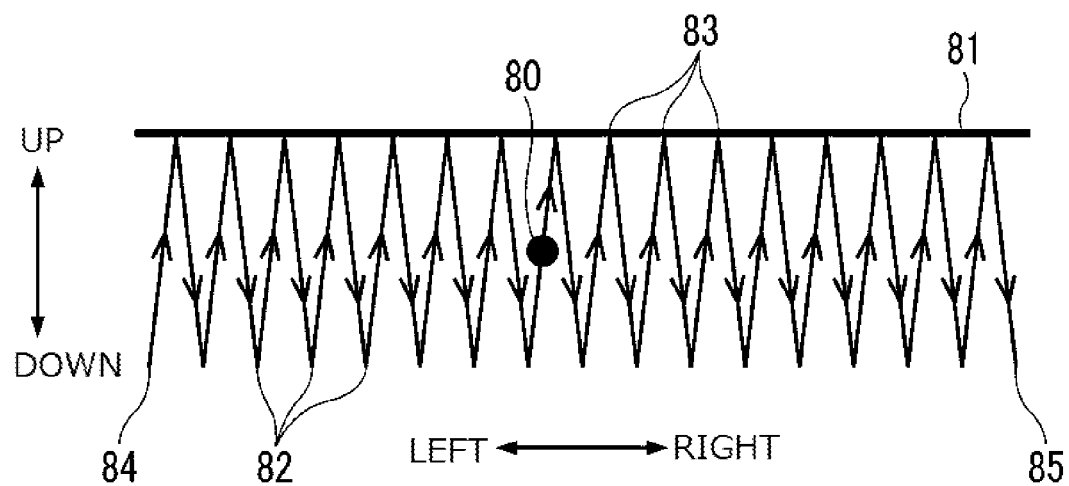
FIGS. 6A and 6B are diagrams each illustrating a scanning pattern of light reflected by the reflecting member during a horizontal scanning period including a forward period and a return period.
Figure 6B:
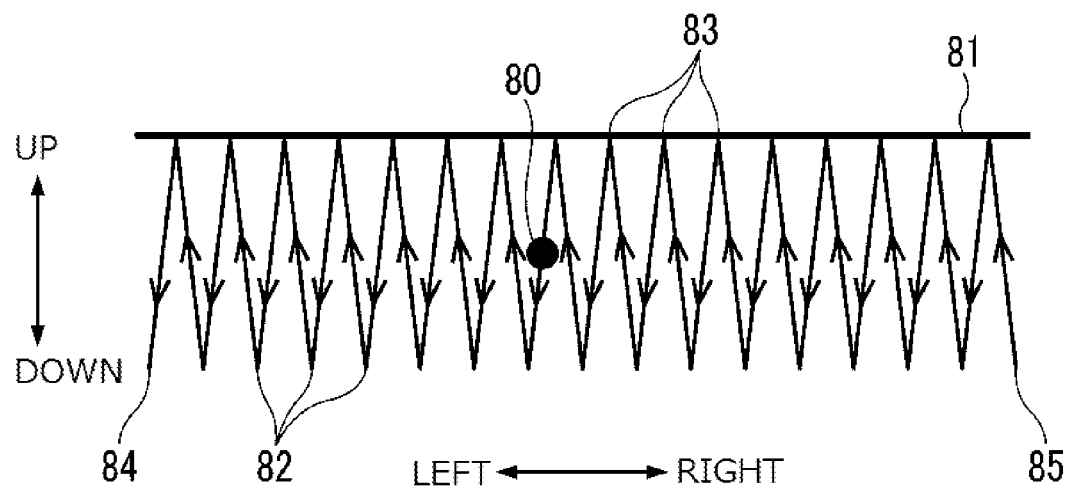

FIGS. 6A and 6B are diagrams each illustrating a scanning pattern of the reflected light reflected by the reflecting member 2 (being a light spot projected from the vehicle headlight 10) within an illumination area in front of a vehicle body. In order to facilitate the understanding of the scanning pattern by the reflected light from the vehicle headlight 10, a virtual screen is assumed to be in front of the vehicle headlight 10 at a predetermined distance away from the vehicle and can be perpendicular to both axial lines at α=90° and β=90°, and the scanning pattern is assumed to be formed on the virtual screen by the light spot 80 of the reflected light from the vehicle headlight 10.

FIG. 6A is a diagram illustrating the scanning pattern of the reflected light reflected by the reflecting member 2 during a horizontal scanning period including a forward period while FIG. 6B is a diagram illustrating the scanning pattern of the reflected light reflected by the reflecting member 2 during the horizontal scanning period including a return period.

As shown in FIGS. 6A and 6B, the reflected light from the optical deflector 1 can appear as the light spot 80 on the virtual screen. The scanning patterns of FIGS. 6A and 6B are shown as a scanning trajectory of the light spot 80 below the cut line 81. It should be noted that the arrow indicated on the trajectory is directed along the moving direction of the light spot 80.

In FIGS. 6A and 6B, one vertical scanning cycle of the reflected light moving in the vertical direction is a period between a time when the light spot 80 starts from a lower turned edge point 82 and a time when the light spot 80 reaches the next lower turned edge point 82 (or between an upper turned edge point 83 and the next upper turned edge point 83) as shown on the virtual screen. One horizontal scanning cycle of the reflected light moving in the horizontal direction is a period between a time when the light spot 80 starts from a leftmost turned edge point 84 and a time when the light spot 80 returns to the same leftmost turned edge point 84 (or between a rightmost turned edge point 85 and the same rightmost turned edge point 85 again) as shown on the virtual screen. Therefore, the vertical scanning frequency of the reflected light is the reciprocal of the vertical scanning period, and the horizontal scanning frequency of the reflected light is the reciprocal of the horizontal scanning period.

As described above, the vehicle headlight 10 can be configured such that the vertical scanning frequency can be set larger than the horizontal scanning frequency because the primary scanning direction and the secondary scanning direction can be set to the vertical direction and the horizontal direction, respectively. The light spot 80 moving in the forward period of the horizontal scanning cycle can move from left to right in terms of the vertical scanning cycle of the light spot 80 by one pitch as a unit over the illumination area as shown in FIG. 6A. In the same manner, during the return period, the light spot 80 can move from right to left in terms of the vertical scanning cycle by one pitch as a unit over the illumination area as shown in FIG. 6B.

FIGS. 6A and 6B show the example in which the cut line 81 is set horizontal. Specifically, the illumination area can be limited to the same height irrespective of the horizontal positions. In addition to this, in the illustrated example, the laser light source 11 is continuously controlled to be turned on. Accordingly, the upper turned edge points 83 are defined by the controlled illumination height of the light spot 80.

In the optical deflector 1, the inner piezoelectric actuators 31 and 32 can be used for high frequency reciprocal motion of the reflecting member 2 while the outer piezoelectric actuators 51 and 52 can be used for low frequency reciprocal motion of the reflecting member 2.

On the contrary, the conventional vehicle headlight has been configured such that the primary scanning direction and the secondary scanning direction are set to the horizontal direction and the vertical direction, respectively, and accordingly, the optical deflector contained in the conventional vehicle headlight has been arranged to be horizontally long in the casing of the vehicle headlight. Specifically, the optical deflector 1 of the conventional vehicle headlight has been disposed such that the X and Y axes orthogonal to each other in the optical deflector 1 are substantially horizontal and vertical, respectively.

The vehicle headlight 10 of the presently disclosed subject matter can be configured such that the primary scanning direction and the secondary scanning direction are set to the vertical direction and the horizontal direction, respectively, and accordingly, the optical deflector contained in the vehicle headlight 10 can be disposed such that the X and Y axes orthogonal to each other in the optical deflector 1 are substantially vertical and horizontal, respectively.

Both the conventional vehicle headlight and the vehicle headlight 10 according to the example of the presently disclosed subject matter both can swingingly move the reflected light at high speed in the primary scanning direction by the inner piezoelectric actuators 31 and 32. However, in the conventional vehicle headlight, the primary scanning direction is the horizontal direction in which the scanning angle range of the reflected light is relatively large (50° in FIG. 4A). Therefore, the inner piezoelectric actuators 31 and 32 operate at high speed in the large swing range, thereby increasing the load on the actuator and decreasing the durability thereof.

In contrast to this, in the vehicle headlight 10 of the present exemplary embodiment, the primary scanning direction can be the vertical direction in which the scanning angle range of the reflected light is relatively small, and accordingly, although the inner piezoelectric actuators 31 and 32 must operate at high speed in the swing range, the swing range is significantly reduced when compared to the conventional case (10° in FIG. 4B). As a result, the load on the inner piezoelectric actuators 31 and 32 is significantly reduced while the durability can be improved.

Figure 7:
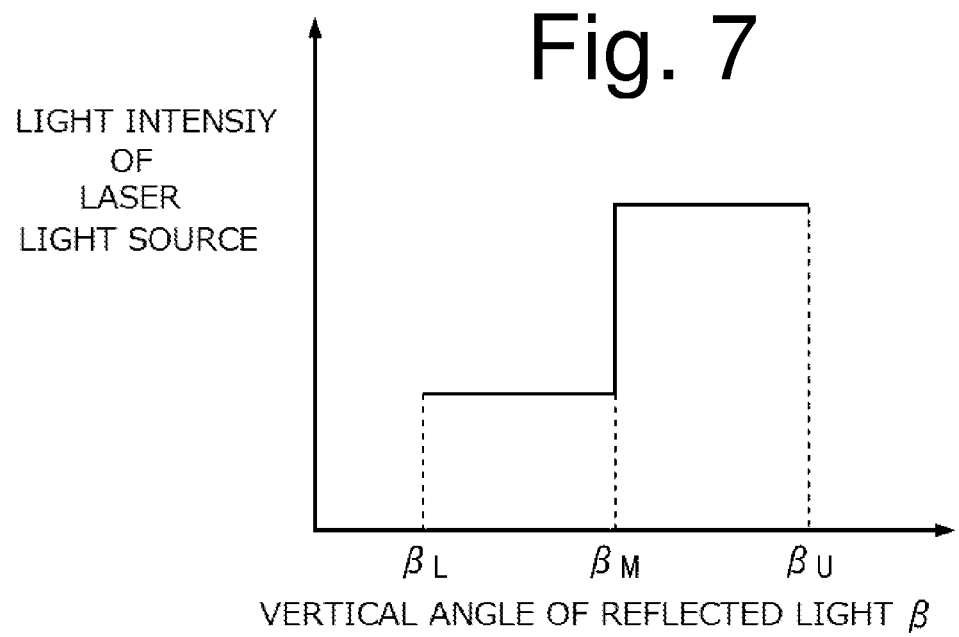
FIG. 7 is a diagram illustrating the relationship between the light intensity of light emitted from a laser light source used in the vehicle headlight of FIG. 3A and the vertical angle of reflected light.

FIG. 7 is a diagram illustrating the relationship between the light intensity of light emitted from the laser light source 10 used in the vehicle headlight 10 of FIG. 3A and the vertical angle $\beta$ of reflected light. The light intensity of the laser light source 11 can be switched by two stages in accordance with the vertical angle $\beta$. Specifically, assume that $\beta_M$ is defined as a vertical angle at which the light intensity of the laser light source 11 can be switched between high and low. Accordingly, the light intensity of the light source can be controlled to be low in the range of $\beta_L \leq \beta \leq \beta_M$ whereas the light intensity of the light source can be controlled to be high in the range of $\beta_M \leq \beta \leq \beta_U$.

The light intensity of the laser light source 11 can be controlled by adjusting the current amount to be fed to the laser light source 11 by means of the controller 12. The larger the current amount to be fed to the laser light source 11 is, the more the light intensity emitted by the laser light source 11 is increased. Specific example of the control of the current amount to be fed to the laser light source 11 by the controller 12 may include (a) a method of increasing or decreasing the current amount to be fed to the laser light source 11 while the laser light source 11 is continuously energized, and (b) a method of supplying the laser light source 11 with a discontinuous energization pulsed current at a predetermined frequency, and increasing or decreasing the pulse width (duty ratio) of the discontinuous energization pulsed current.

The range of $\beta_L \leq \beta \leq \beta_M$ can correspond to the vertical angle $\beta$ in a period during which the light spot is scanning a closer part of the illumination area close to the vehicle body in the vertical scanning cycle while the range of $\beta_M \leq \beta \leq \beta_U$ can correspond to the vertical angle $\beta$ in a period during which the light spot is scanning a farther part of the illumination area far from the vehicle body. When the swing motion of the reflecting member 2 around the X axis by the outer piezoelectric actuators 51 and 52 is at a constant speed, the scanning speed of the light spot 80 in the farther-nearer direction over the horizontally-wide illumination area may be higher and the light spot 80 may have a larger diameter as the position of the light spot 80 is farther from the vehicle body. Therefore, if the headlight is a conventional type and the light intensity of the laser light source is constant, the farther the position of the light spot is in the horizontally-wide illumination area, the more the illuminance decreases.

To cope with this, it is conceivable that the swing speed of the reflecting member 2 around the Y axis by the outer piezoelectric actuators 51 and 52 can be controlled to be low as the reflected light is projected at the farther area. However, the mechanical high speed turn motion of the reflecting member 2 is controlled by the speed increase/decrease at a prescribed accuracy, and accordingly, the control of the outer piezoelectric actuators 51 and 52 may be difficult.

On the other hand, the vehicle headlight 10 of the present exemplary embodiment can perform the light intensity control of the laser light source 11 as shown in FIG. 7. Since the light spot 80 is increased in illuminance during the time period during which the light spot 80 is projected on a farther area of the illumination area, the illuminance over the illumination area can be uniform. The control of the light intensity of the laser light source 11 can be achieved by the control of the current amount to be fed to the laser light source 11 unlike the mechanical control for the control of the outer piezoelectric actuators 51 and 52. This means that the control method can be simplified and the accuracy in the illuminance control over the illumination area can be improved.

In the conventional technology, when the primary scanning direction of the scanning light is horizontal, the time period during which the scanning light remains in the farther area can become relatively long, and therefore, the time period during which the large light intensity of the laser light source 11 is maintained can become long. This may increase the heat generated from the laser light source 11, resulting in deterioration of light emission efficiency of the laser light source 11. To compensate for this, the conventional technology increases the current amount for the laser light source 11. However, the heat amount generated from the laser light source 11 may be increased, resulting in further deterioration of the light emission efficiency, which is likely to contribute to a vicious cycle.

In contrast to this, the vehicle headlight 10 of the present exemplary embodiment can adopt the vertical primary scanning direction of the scanning light. Further, the first time period during which the light spot is projected on a farther area of the illumination area can be the time period during which the light intensity of the laser light source 11 is increased, and the second time period during which the light spot is projected on a nearer area of the illumination area can be the time period during which the light intensity of the laser light source 11 is decreased. The vehicle headlight 10 of the present exemplary embodiment can increase the switching frequency between the first time period and the second time period, thereby shortening the first time period during which the large current amount is continuously fed to the laser light source 11. Since the time period for the heat generation from the laser light source 11 can be decreased as appropriate, the deterioration of the light emission efficiency can be avoided.

FIG. 7 shows that the light intensity of the light source 11 is controlled by two steps with respect to the variation of the vertical angle β in the vertical scanning cycle. However, the presently disclosed subject matter is not limited thereto, and the switching step may be three or more steps or nonstop control may be adopted as long as the light intensity of the laser light source 11 can be increased as the vertical angle β is increased.

Figure 8:
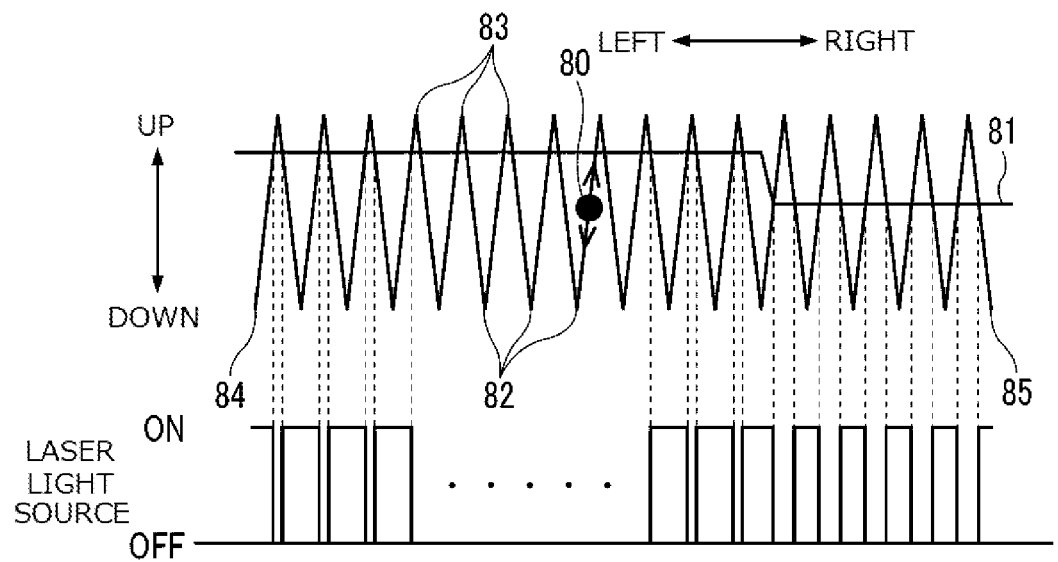
FIG. 8 is an explanatory diagram showing how the laser light source is controlled (ON-OFF control) to generate the cut line appropriately.

FIG. 8 is an explanatory diagram showing how the laser light source 11 is controlled (ON-OFF control) to generate the cut line 81 appropriately. In FIG. 8, it is assumed that the vehicle headlight 10 of the present exemplary embodiment can travel on the left side lane of a road, and the right side lane adjacent thereto is a lane on which an opposite vehicle can travel. The right side portion of the cut line 81 corresponds to the illumination area on the opposite vehicle lane, and in order to suppress the generation of glare light from the vehicle headlight 10 to a driver of the opposite vehicle, the cut line 81 can be configured that the right side portion of the cut line 81 is set to be lower than the left side portion so as to be lower than the position of the driver's eyes on the opposite vehicle. Of course, the cut line can be configured differently for different driving markets, including mirrored or reversed in configuration for the U.S. market in which the vehicle is typically driven on the right side lane of the road.

FIG. 8 shows the trajectory of the light spot 80 when the laser light source 11 is always turned on in order to concretely describe the swing motion of the reflecting member 2. Specifically, to be described later, the reflecting member 2 is turned at the respective turned edges while the laser light source 11 can be controlled to be turned off at a certain swing angle range. This can produce a trajectory including a vacant trajectory where the light spot 80 is not projected while the reflecting member 2 is still moving.

Although FIGS. 6A and 6B show trajectories of the light spot 80 during the forward period and the return period in the horizontal scanning period, respectively, FIG. 8 includes both trajectories in a single diagram. Also in FIG. 8, the trajectories of the light spot 80 during the forward period and the return period travel respective opposite directions.

The controller 12 can control the swing angle of the reflecting member 2 around the Y axis by the inner piezoelectric actuators 31 and 32 so that the upper turned edges 83 are arranged above the cut line 81 and fixed irrespective of the horizontal scanning positions of the light spot 80. To fix the upper turned edges to produce an appropriate cut line 81 by controlling the swing angle of the reflecting member 2 around the Y axis can simplify the control of the inner piezoelectric actuators 31 and 32 by the controller 12.

The controller 12 can further control the turning-OFF of the laser light source 11 during the period during which the light spot 80 scans above the cut line 81. Specifically, the controller 12 can detect the scanning position of the light spot 80 on the basis of the swing angles of the reflecting member 2 around the X and Y axes. When the scanning position of the reflection light or the light spot 80 from below to above the cut line 81 is detected, the controller can control the laser light source 11 to be turned off. Furthermore, when the scanning position of the reflection light or the light spot 80 from above to below the cut line 81 is detected, the controller can control the laser light source 11 to be turned on.

With this configuration, the reflecting member 2 can be controlled to be directed upward by the inner piezoelectric actuators 31 and 32 so as to project the reflection light to the area above the cut line 81 while the laser light source 11 is turned off so that the reflection light is not projected to the area above the cut line 81, namely, the turned-off state is maintained when the light spot 80 is to be placed above the cut line 81.

The present exemplary embodiment illustrated in FIG. 8 can be achieved by the ON-OFF control of the laser light source 11. However, in addition to the ON-OFF control as shown in FIG. 8, the light intensity control of the laser light source 11 as shown in FIGS. 6A and 6B may be performed. Furthermore, when the ON-OFF control and/or the light intensity control are/is performed, the laser light source 11 can be cooled during the OFF period or the light intensity decreased period in the vertical scanning cycle. Therefore, irrespective of the increased light intensity of the laser light source 11 to the farther area of the illumination area, the decrease in light emission efficiency of the laser light source 11 can be suppressed or prevented.

Figure 9:
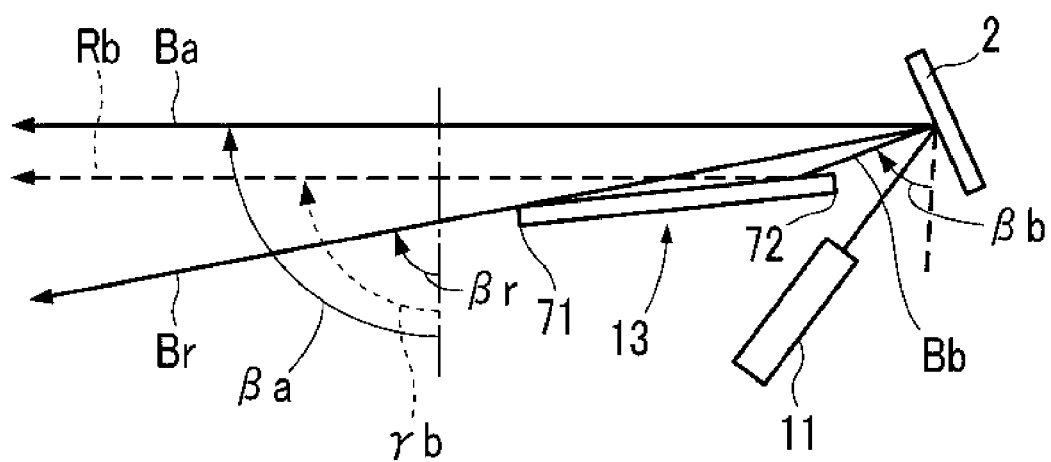
FIG. 9 is a diagram illustrating the relative positional relationship between a first reflecting member of the optical deflector and a second reflecting member disposed outside the optical deflector.

Next, a variation (second exemplary embodiment) of the embodiment illustrated in FIG. 3B (the vehicle headlight 10 including the auxiliary reflection member 13) will be descried with reference to FIG. 9. Since the main components of the present variation illustrated in FIG. 3B can be the same as those of the vehicle headlight 10 illustrated in FIG. 3A, descriptions thereof are omitted herein, and a description will be given of the parts relating to the auxiliary reflecting member 13.

FIG. 9 is a diagram illustrating the relative positional relationship between the reflecting member 2 of the optical deflector 1 and the auxiliary reflecting member 13 disposed outside the optical deflector 1. FIG. 9 shows how the luminous fluxes are travelling when viewed from the Y axis direction. The reflecting member 2 can receive the laser light from the laser light source 11 while the reflecting member 2 turns (swings) at a certain frequency around the Y axis extending in the horizontal direction, thereby reflecting the laser light forward of the vehicle headlight 10. The auxiliary reflecting member 13 can have a front end 71 and a rear end 72 and can be disposed in front of the reflecting member 2. Laser light that is of the laser light reflected by the reflecting member 2 and is incident on an area from the front end 71 and the rear end 72 of the auxiliary reflecting member 13 can be reflected by the auxiliary reflecting member 13 and projected forward from the vehicle headlight 10.

In FIG. 9, Ba, Bb, and Br denote the laser light beams reflected by the reflecting member 2. Rb denotes the laser light beam that corresponds to Bb reflected by the auxiliary reflecting member 13. Ba and Bb denote the upwardmost and downwardmost laser beams of the laser light beams reflected by the reflecting member 2. Br denotes the downwardmost laser beam of the laser beams reflected by the reflecting member 2 and not reflected by the auxiliary reflecting member 2 but which travel straight forward.

In FIG. 9, $\beta a$, $\beta b$, and $\beta r$ denote vertical angles of Ba, Bb, and Br, respectively, and $\gamma b$ denotes a vertical angle of Rb. The vertical angle $\beta$ can be defined by an angle around the Y axis of the reflecting member 2 as in the definition for $\beta_U$, $\beta_L$ shown in FIG. 4B, when the position in the immediately below vertical direction is assumed to $\beta=0°$.

The auxiliary reflecting member 13 can be formed as a flat plane in the present exemplary embodiment. The allowable inclination angle range of the auxiliary reflecting member 13 is denoted by the range of the vertical angle $\beta$. Then, in order to place the rear end 72 of the auxiliary reflecting member 13 on the light path of Bb and for the auxiliary reflecting member 13 to receive part of the laser light from the reflecting member 2, the vertical angle $\beta$ of the auxiliary reflecting member 13 can be such that $\beta b \leq$ (the vertical angle $\beta$ of the auxiliary reflecting member 13)$\leq \beta a$. Specifically, the illustrated vehicle headlight 10 can be configured such that (the vertical angle $\beta$ of the auxiliary reflecting member 13)=$(\beta a+\beta b)$. In other words, the auxiliary reflecting member 13 can be set to be substantially parallel (i.e., parallel or almost parallel) to the laser light reflected by the reflecting member 2 and travelling along a center line between Ba and Bb (hereinafter, called as "center line light beam").

The rear end 72 of the auxiliary reflecting member 13 can be disposed on or behind the light path of Bb in order for Bb to be reliably incident thereon. As the front end 71 is disposed more forward, the vertical angle $\beta r$ increases and is closer to the vertical angle $\beta$ of the center line light beam $(=(\beta a+\beta b)/2)$. However, there is a limitation of the size of the auxiliary reflecting member 13 extending forward, and it is difficult to set $\beta r=(\beta a+\beta b)/2$. Therefore, in actual practice, it can be set to $\beta r<(\beta a+\beta b)/2$.

The laser light reflected by the reflecting member 2 in the vertical angle range of $\beta r \leq \beta \leq \beta a$ may not be reflected by the auxiliary reflecting member 13, but can directly travel to the illumination area while maintaining the vertical axis $\beta$. In view of this, $\beta a$ and $\beta r$ correspond to $\beta_U$ and $\beta_L$ in FIG. 4B.

The laser light reflected by the reflecting member 2 in the vertical angle range of $\beta b \leq \beta \leq \beta r$ may not be reflected by the auxiliary reflecting member 13, and may be projected from the auxiliary reflecting member 13 by a changed vertical angle $\beta$. Hereinafter, the pair of laser beams symmetric with respect to the center line light beam (being a symmetric axis) is called as "symmetric pair."

The lower laser beam below the symmetric axis is referred to as a "lower laser beam of the symmetric pair," while the upper laser beam above the symmetric axis is referred to as an "upper laser beam of the symmetric pair."

The upper laser beam of the symmetric pair does not include all the laser beam traveling along the optical path above Br, but may exclude the laser beam projected from the reflecting member 2 in the range of $\beta r \leq \beta < \{(\beta a+\beta b)/2-\beta r\}+(\beta a+\beta B)/2=\beta a+\beta b-\beta r$. Such an exclusion may cause discontinuity between the scanning lines 95a and 95c as illustrated in FIG. 10B, and the discontinuity will be described in detail with reference to FIG. 10B later.

Since the auxiliary reflecting member 13 is parallel to the center line light beam in the present exemplary embodiment, the laser light reflected by the reflecting member 2 in the vertical angle range $\beta$ of $\beta b \leq \beta < \beta r$, the vertical angle $\gamma$ of the reflected light by the auxiliary reflecting member 13 can be the same as the vertical angle $\beta$ of the upper laser beam of the symmetric pair. Therefore, it is configured such that $\gamma b=\beta a$.

Figure 10A:
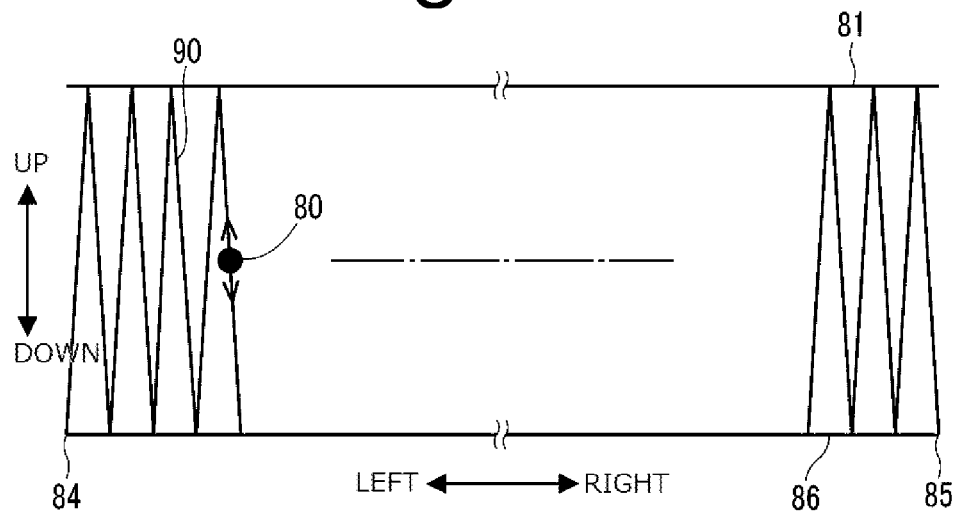
FIGS. 10A and 10B are a scanning pattern of laser light from the vehicle headlamp of FIG. 3A and a scanning pattern of laser light from the vehicle headlamp of FIG. 3B.
Figure 10B:
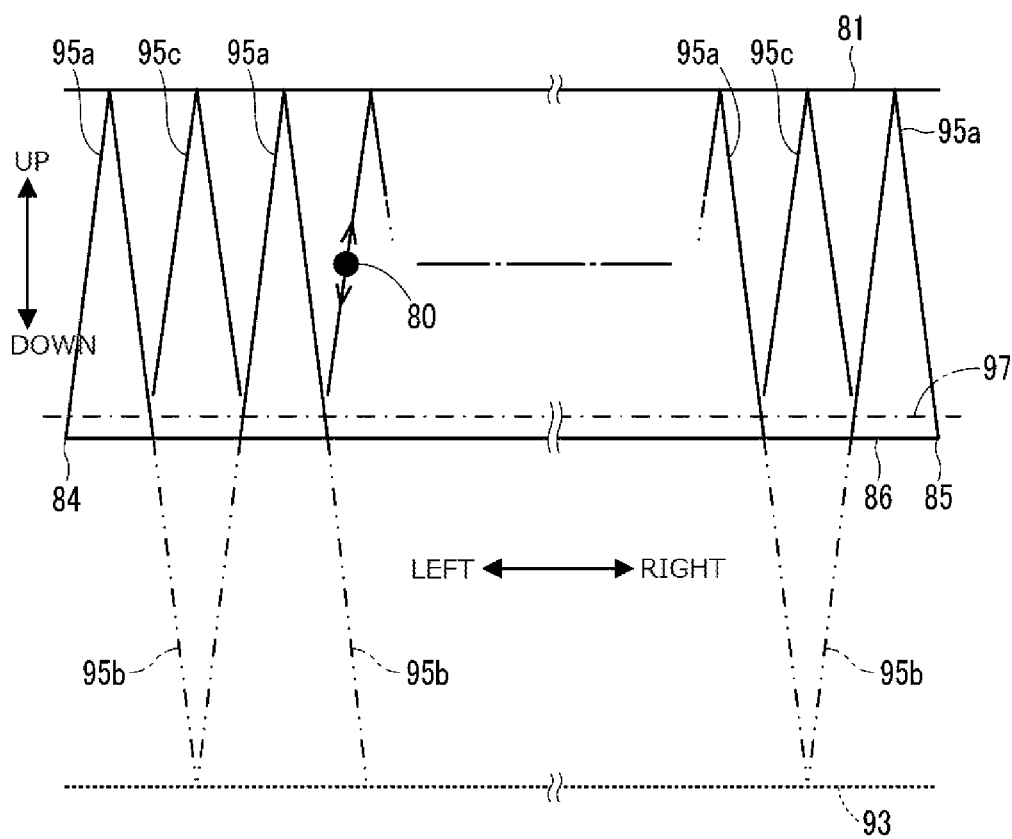

FIGS. 10A and 10B are a scanning pattern of laser light from the vehicle headlamp 10 with no auxiliary reflecting member 13 of FIG. 3A (the vehicle headlight 10 of the first exemplary embodiment) and a scanning pattern of laser light from the vehicle headlamp 10 with the auxiliary reflecting member 13 of FIG. 3B (the vehicle headlight 10 of the second exemplary embodiment), respectively.

The scanning patterns illustrated in FIGS. 10A and 10B are not scanning patterns of laser beams projected over an actual illumination area, but are those formed on a virtual screen provided in front of the vehicle headlight 10 a predetermined distance away from the vehicle and being perpendicular.

Reference numeral 80 denotes a light spot generated by the laser beam from the optical deflector 1 on the virtual screen. The scanning pattern of the light spot 80 can be represented by the scanning line 90 in the first exemplary embodiment in FIG. 10A while the scanning pattern of the light spot 80 can be represented by the solid scanning lines 95a and 95c in the second exemplary embodiment in FIG. 10B. In addition, the scanning line 95b by the chain double-dashed line in FIG. 10B is a scanning line instead of the scanning line 95c on the virtual screen when the auxiliary reflecting member 13 is removed from the vehicle headlight 10 of the second exemplary embodiment while the various set values including the swing frequency and the like are not changed.

Reference numeral 81 denotes a cut line as a border line of the scanning pattern area at the upper portion thereof, and reference numeral 86 denotes a lower turned edge line as a border line of the scanning pattern area at the lower portion thereof. Reference numerals 84 and 85 denote a leftmost turned edge point and a rightmost turned edge point in the horizontal scanning, respectively. The laser light at angles $\beta_U$ and $\beta_L$ can produce light spots 80 on the virtual screen at levels of the cut line 81 and the lower turned edge line 86, respectively.

In FIGS. 10A and 10B, the primary scanning direction and the secondary scanning direction can be set to the vertical direction and the horizontal direction in the vehicle headlight 10 of the second exemplary embodiment as in the vehicle headlight of the first exemplary embodiment so that the number of reciprocating motion in the vertical direction is larger than the number of reciprocating motion in the horizontal line as shown by the scanning lines 90 and 95.

As in the previous exemplary embodiment, in order to set the vertical direction and the horizontal direction as the primary scanning direction and the secondary scanning direction of the light sport 80 over the illumination area, the inner piezoelectric actuators 31 and 32 are used for causing the reflecting member 2 to reciprocatingly swing at high frequency and the outer piezoelectric actuators 51 and 52 are used for causing the reflecting member 2 to reciprocatingly swing at low frequency.

As shown in FIGS. 4A and 4B, the vehicle headlight 10 of the second exemplary embodiment can project laser light in a horizontal scanning range of 50° and in a vertical scanning range of 10°. The primary scanning frequency is relatively larger than the secondary scanning frequency, and accordingly, the maximum swing speed of the reflecting member 2 can be lowered due to the small scanning angle range of the primary scanning direction. As a result, the inner piezoelectric actuators 31 and 32 and the outer piezoelectric actuators 51 and 52 of the optical deflector 1 can bear lower load resulting in improved durability. This can also increase the lifetime of the optical deflector 1.

A description will next be given of the scanning pattern of the light spot 80 from the vehicle headlight 10 of FIG. 3A according to the first exemplary embodiment with reference to FIG. 10A. Since the vehicle headlight 10 according to the first exemplary embodiment does not include the auxiliary reflecting member 13, the laser light from the reflecting member 2 can travel forward irrespective of the vertical angle $\beta$. Therefore, Ba and Bb from the reflecting member 2 can be laser beams projected from the vehicle headlight 10 by the respective vertical angles $\beta_U$ and $\beta_L$. Namely, it is set to $\beta a = \beta_U$ and $\beta b = \beta_L$. As a result, the scanning line 90 generated by the light spot 80 from the vehicle headlight 10 according to the first exemplary embodiment, as shown in FIG. 10A, can be formed such that the light spot 80 moves between the cut line 81 and the lower turned edge line 86 while moving from right to left by one pitch as a unit to reciprocate between the leftmost turned edge point 84 and the rightmost turned edge point 85.

The swing speed of the reflecting member 2 around the Y axis (the swing speed as an absolute value without consideration of the direction of the swing) may be lowered at both turned edges within the swing range in order to return back and may be the fastest at the center of the swing range. On the other hand, the illumination area of the laser beam from the reflecting member 2 may be darkened more as the scanning speed of the light spot 80 (the scanning speed as an absolute value without consideration of the scanning direction) is faster. Since the cut line 81 and the lower turned edge line 86 of the illumination area corresponds to the farther border line and the nearer border line of the illumination area, the illuminance distribution of the illumination area by the vehicle headlight 10 of the first exemplary embodiment can be configured such that the areas closer to the farther border line and the nearer border line are bright and the area at the center of the illumination area is dark.

The ideal illuminance distribution of the illumination area is such that the area closer to the nearer border line is dark and the area toward the farther border line becomes brighter, and the area corresponding to the cut line 81 is the brightest. Therefore, the illuminance distribution of the vehicle headlight 10 according to the first exemplary embodiment can be improved.

In the vehicle headlight 10 according to the first exemplary embodiment, the swing range of the reflecting member 2 around the Y axis can be $(\beta_U - \beta_L)/2$ due to $\beta a = \beta_U$ and $\beta b = \beta_L$. Furthermore, in the vehicle headlight 10 according to the first exemplary embodiment, during the half of the cycle of the secondary scanning by moving the light spot 80 from the leftmost turned edge point 84 to the rightmost turned edge point 85, the reflecting member 2 can reciprocatingly swing around the Y axis by the number of the reciprocating swing motion between the cut line 81 and the lower turned edge line 86 as shown in FIG. 10A.

Next, a description will be given of the scanning pattern of the light spot 80 from the vehicle headlight 10 according to the second exemplary embodiment with reference to FIG. 10B. In the vehicle headlight 10 according to the second exemplary embodiment, the laser light reflected by the reflecting member 2 within the vertical angle range of $\beta r \leq \beta \leq \beta a$ may not be incident on the auxiliary reflecting member 13, and thus, can travel straight forward to the illumination area to form the scanning line 95a. Further, the laser light reflected by the reflecting member 2 within the vertical angle range of $\beta b \leq \beta < \beta r$ can be incident on the auxiliary reflecting member 13, and thus, can be reflected by the same to travel by a vertical angle $\gamma$ the same as the vertical angle of the upper laser beam of the symmetric pair, to the illumination area to form the scanning line 95c.

In FIG. 10B, reference numeral 93 denotes the lower turned edge line when the auxiliary reflecting member 13 is removed from the vehicle headlight 10 of the second exemplary embodiment. In the vehicle headlight 10 without the auxiliary reflecting member 13 according to the first exemplary embodiment, the reflection light from the reflecting member 2 within the vertical angle range of $\beta b \leq \beta < \beta r$ can travel straight forward to the illumination area and thus, the scanning ling 95c is not formed while the scanning line 95b is formed below the lower turned edge line 86 instead of the scanning line 95c. Thus, the scanning line 95b and the scanning line 95c are symmetric with respect to the horizontal line 97 at the level where the light spot 80 by the center line light beam is generated on the virtual screen.

In FIG. 10B, the reason why the scanning line 95c is discontinuous to the lower turned edge line 86 is that the vertical angle is set to $\beta r < (\beta a + \beta b)/2$ and thus the laser light reflected by the reflecting member 2 within the vertical range of $\beta r \leq \beta < (\beta a + \beta b)/2$ does not correspond to the upper laser beam of the symmetric pair. Note that, if the auxiliary reflecting member 13 extends forward more and the front end 71 thereof is positioned more forward, the lower turned edge like 86 becomes closer to the horizontal line 97 and the distance of the discontinuity between the lower end of the scanning line 95c and the lower turned edge line 86 is decreased.

The light spots 80 appearing near the cut line 81 where the upper ends of the scanning lines 95a and 95c are positioned are generated when the reflecting member 2 turns back around the Y axis at the upper side and the lower side, meaning that the light spots 80 are generated when the swing speed is decreased. Further, when the light spots 80 pass through the horizontal line near the lower turned edge line 86, the reflecting member 2 swinging around the Y axis turns near the center point within the swing range, meaning that the swing speed is the maximum.

As a result of this, the scanning pattern by the vehicle headlight 10 according to the second exemplary embodiment as shown in FIG. 10B can be configured such that the area near the lower turned edge line 86 is dark, the area from the lower turned edge line 86 to the cut line 81 becomes brighter, and the area near or on the cut line 81 becomes the brightest. Specifically, this illuminance distribution formed by the vehicle headlight 10 according to the second exemplary embodiment can be configured such that the area closer to the closest border to the vehicle body can be darkened, the area from the closest border to the farthest border becomes brighter, and the area near or on the cut line 81 becomes the brightest, meaning that the ideal illuminance distribution can be achieved.

Further, the vehicle headlight 10 according to the second exemplary embodiment can be configured such that the primary scanning direction and the secondary scanning direction are set to the vertical direction and the horizontal direction, respectively. Therefore, when compared with the case the primary scanning direction and the secondary scanning direction are set to the horizontal direction and the vertical direction, respectively, the number of the turned back of the light spot 80 at the cut line 81 can be increased. This can contribute for the increase of the brightness on the cut line 81.

In the vehicle headlight 10 according to the second exemplary embodiment, the laser light reflected by the reflecting member 2 by the vertical angle $\beta_L$ (see FIGS. 4A and 4B) is denoted by Br, and therefore, the vertical angle βb from the reflecting member 2 should be an angle much lower than βr. If Br is set to the center line light beam, the swing angle of the reflecting member 2 around the Y axis should be set within $(\beta_U - \beta_L)$, which is twice the swing range of $(\beta_U - \beta_L)/2$ of the vehicle headlight 10 according to the first exemplary embodiment.

On the other hand, in the vehicle headlight 10 according to the second exemplary embodiment, the scanning lines 95a by the laser light straight forward from the reflecting member 2 and the scanning lines 95c by the laser light reflected by the auxiliary reflecting member 13 can be alternately arranged in the horizontal direction. Therefore, when the vehicle headlight 10 according to the second exemplary embodiment generates the scanning lines with the same scanning line density as that by the vehicle headlight 10 according to the first exemplary embodiment, the primary scanning frequency can be set to about half the primary scanning frequency by the vehicle headlight 10 according to the first exemplary embodiment. The lowering of the primary scanning frequency by the vehicle headlight 10 according to the second exemplary embodiment can reduce the load on the inner piezoelectric actuators 31 and 32 which can cause the reflecting member 2 to swing around the Y axis and can therefore contribute to the improvement in durability of the inner piezoelectric actuators 31 and 32.

The presently disclosed subject matter has been described with respect to specific exemplary embodiments, but is not limited thereto. Examples of the light source may include, in addition to the laser light source 11, a light emitting diode, and the like. In addition to this, with a collimator lens disposed between a light source and a reflecting member, a high intensity discharge lamp, a halogen lamp, or the like can be used.

The mirror surface of the auxiliary reflecting member 13 can be a planar surface, a convex surface, a concave surface, combination concave/convex, or other the like curved surface in order to adjust the intended light distribution pattern in the illumination area. Furthermore, the normal line directions on the reflecting surface(s) of the mirror surface can be appropriately set in accordance with the intended light distribution pattern in the illumination area.

The auxiliary reflecting member 13 can be fixed to a casing (not shown) of the vehicle headlight 10, or can be fixed so that the vertical angle β and/or the horizontal angle α of the auxiliary reflecting member 13 can be varied depending on the vehicle speed, vehicle steering direction, vehicle steering angle, and the like.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit, comprising:
   a light source;
   a reflecting member configured to reflect light from the light source toward an illumination area in front of a vehicle body;
   an actuator configured to turn the reflecting member around a first axis and a second axis so that the illumination area in front of the vehicle body can be vertically and horizontally scanned with the light reflected by the reflecting member;
   an actuator controller configured to control the actuator such that a scanning frequency of the reflected light in a vertical direction is larger than a scanning frequency of the reflected light in a horizontal direction; and
   a light intensity controller, wherein
   the actuator controller controls the actuator so that upper turned edges of scanning in the vertical direction are located above a cut line of the illumination area, and
   the light intensity controller is configured to control the light source during the vertical scan period such that the light source is turned off during a period during which a light spot formed by the light source is located above the cut line.

2. The vehicle lighting unit according to claim 1, wherein the first axis is a swinging axis around which the reflecting member is caused to swing horizontally so that the reflected light scans the illumination area horizontally,
   the second axis is a swinging axis around which the reflecting member is caused to swing vertically so that the reflected light scans the illumination area vertically, and
   the actuator is configured to cause the reflecting member to swing around the first axis and the second axis simultaneously such that a swing frequency of the reflecting member around the second axis is larger than a swing frequency of the reflecting member around the first axis.

3. The vehicle lighting unit according to claim 1, further comprising a light intensity controller configured to at least one of dim and turn off power to the light source at a certain time duration during a period of rotation of the reflecting member.

4. The vehicle lighting unit according to claim 1, wherein the actuator includes a piezoelectric actuator.

5. A vehicle lighting unit, comprising:
   a light source;
   a reflecting member configured to reflect light from the light source toward an illumination area in front of a vehicle body;
   an actuator configured to turn the reflecting member around a first axis and a second axis so that the illumination area in front of the vehicle body can be vertically and horizontally scanned with the light reflected by the reflecting member;
   an actuator controller configured to control the actuator such that a scanning frequency of the reflected light in a vertical direction is larger than a scanning frequency of the reflected light in a horizontal direction; and
   a light intensity controller configured to control the light source such that when the illumination area is divided into an upper area and a lower area, light intensity of the light source is increased during a period of scanning the upper area as compared to light intensity during a period of scanning the lower area in a vertical scan period of the
light reflected by the reflecting member, wherein the actuator controller controls the actuator so that upper
turned edges of scanning in the vertical direction are
located above a cut line of the illumination area, and the light intensity controller is configured to control the
light source during the vertical scan period such that the
light source is turned off during a period during which a
light spot formed by the light source is located above the
cut line.

6. The vehicle lighting unit according to claim 5, wherein
the light intensity controller is configured to control the light
intensity of the light source at least one of, on the basis of a current value variation when the light
source is continuously energized, and on the basis of a variation in pulse width of a pulsed current
when the light source is energized in a discontinuous
manner.

7. A vehicle lighting unit, comprising:

a light source;

a reflecting member configured to reflect light from the
light source toward an illumination area in front of a
vehicle body;

an actuator configured to turn the reflecting member
around a first axis and a second axis so that the illumination area in front of the vehicle body can be vertically
and horizontally scanned with the light reflected by the
reflecting member;

an actuator controller configured to control the actuator
such that a scanning frequency of the reflected light in a
vertical direction is larger than a scanning frequency of
the reflected light in a horizontal direction; and a light intensity controller configured to control the light
source such that when the illumination area is divided
into an upper area and a lower area, light intensity of the
light source is increased during a period of scanning the
upper area as compared to light intensity during a period
of scanning the lower area in a vertical scan period of the
light reflected by the reflecting member, wherein the light intensity controller is configured to control the
light intensity of the light source at least one of, on the basis of a current value variation when the light
source is continuously energized, and on the basis of a variation in pulse width of a pulsed current
when the light source is energized in a discontinuous
manner.

8. A vehicle lighting unit, comprising:

a light source;

a reflecting member configured to reflect light from the
light source toward an illumination area in front of a
vehicle body;

an actuator configured to turn the reflecting member
around a first axis and a second axis so that the illumination area in front of the vehicle body can be vertically
and horizontally scanned with the light reflected by the
reflecting member;

an actuator controller configured to control the actuator
such that a scanning frequency of the reflected light in a
vertical direction is larger than a scanning frequency of
the reflected light in a horizontal direction; and a second reflecting member configured to reflect part of the
light reflected by the reflecting member, wherein the second reflecting member is configured to reflect light
received from the reflecting member and travelling
through a predetermined lower passing range to an illumination direction of the reflected light in an upper
passing range.

* * * * *